(12) United States Patent
Saari

(10) Patent No.: US 9,132,569 B2
(45) Date of Patent: Sep. 15, 2015

(54) FIRE RETARDANT COMPOSITION AND METHOD FOR TREATING WOOD

(75) Inventor: Kimmo Saari, Oulu (FI)

(73) Assignee: FP Wood Oy, Oulu (FI)

( * ) Notice: Subject to any disclaimer, the term of this patent is extended or adjusted under 35 U.S.C. 154(b) by 59 days.

(21) Appl. No.: 14/122,842

(22) PCT Filed: May 29, 2012

(86) PCT No.: PCT/FI2012/000029
§ 371 (c)(1),
(2), (4) Date: Nov. 27, 2013

(87) PCT Pub. No.: WO2012/164143
PCT Pub. Date: Dec. 6, 2012

(65) Prior Publication Data
US 2014/0093742 A1    Apr. 3, 2014

(30) Foreign Application Priority Data
May 30, 2011   (FI) .................................. 20115535

(51) Int. Cl.
*B27K 3/52* (2006.01)
*C09K 21/04* (2006.01)
*C09K 21/10* (2006.01)
*B27K 3/08* (2006.01)
*B27K 3/16* (2006.01)
*B27K 3/20* (2006.01)
*B27K 3/32* (2006.01)

(52) U.S. Cl.
CPC ... *B27K 3/52* (2013.01); *B27K 3/08* (2013.01); *C09K 21/04* (2013.01); *C09K 21/10* (2013.01); *B27K 3/166* (2013.01); *B27K 3/20* (2013.01); *B27K 3/32* (2013.01); *Y10T 428/662* (2015.04)

(58) Field of Classification Search
CPC ............ B27K 3/52; B27K 3/08; B27K 3/166; B27K 3/20; B27K 3/32; C09K 21/04; C09K 21/10; Y10T 428/662

USPC .......................................... 428/541; 252/607
See application file for complete search history.

(56) References Cited

U.S. PATENT DOCUMENTS

| | | | |
|---|---|---|---|
| 6,989,113 B1 * | 1/2006 | Mabey | 252/606 |
| 2007/0289709 A1 | 12/2007 | Chong et al. | |
| 2010/0068400 A1 * | 3/2010 | Reimann et al. | 427/395 |

FOREIGN PATENT DOCUMENTS

| | | |
|---|---|---|
| CN | 1864956 A | 11/2006 |
| DE | 206079 A1 | 1/1984 |
| EP | 0718388 A2 | 6/1996 |
| JP | 55058175 A | 4/1980 |
| WO | 9100326 A1 | 1/1991 |
| WO | WO9100326 * | 1/1991 |
| WO | 20070147299 | 12/2007 |
| WO | 2008150157 A1 | 12/2008 |
| WO | WO2008150157 * | 12/2008 |
| WO | 2010041228 A1 | 4/2010 |

OTHER PUBLICATIONS

Search Report from Finnish Patent Office; Application No. 20115535; Dated Apr. 12, 2012.
International Search Report received for International Patent Application No. PCT/FI2012/000029, dated Dec. 14, 2012, 4 pages.
International Preliminary Report on Patentability and Written Opinion received for International Patent Application No. PCT/FI2012/000029, dated Dec. 12, 2013, 8 pages.
Extended European Search Report received for European Patent Application No. EP12792523.8, dated Jan. 13, 2015, 6 pages.
CN Office Action dated Sep. 23, 2013 re CN App. No. 201280037362.7 (English Translation), 8 pages.

* cited by examiner

*Primary Examiner* — Leszek Kiliman
(74) *Attorney, Agent, or Firm* — Ziegler IP Law Group, LLC

(57) ABSTRACT

The present invention provides an aqueous fire retardant composition comprising phosphoric acid, ammonium, diammonium phosphate, ammonium sulfate, urea, and a complexing agent. The present invention also provides a method for treating wood, and wood obtained by said method.

20 Claims, 5 Drawing Sheets

FIRE RETARDANT COMPOSITION AND METHOD FOR TREATING WOOD

FIELD OF THE INVENTION

The present invention relates to a fire retardant composition for treating materials such as wood. The present invention also relates to a method for treating wood and to wood obtained by said treatment method.

BACKGROUND OF THE INVENTION

Different compositions for treating wood against fire are known. They may contain components such as fine-grained solid material which have fire retardant properties, or intumescent compounds which form an insulating char layer on the coated article in high temperature, or compounds which are impregnated into wood to form for example steam in the case of fire. Many compositions contain compounds which are considered toxic or harmful.

WO91/00327 discloses a water soluble fire retardant composition for impregnation of solid wood products and other cellulosic materials and comprising from about 40% to about 70% of boric acid, at least one nitrogen-containing synergist material which is soluble in water at a solution temperature of from over 0° C. to under 100° C. in an amount which, in combination with boric acid, is effective to enhance the fire retardancy of wood products impregnated therewith as compared to that of the synergist material and boric acid alone, and a combined total of no more than about 15% of materials having an acid strength greater than boric acid, such composition, when introduced into wood products, having substantially no effect on hydrolysis of the wood cellulose and corrosion of metals in contact with the wood product.

U.S. Pat. No. 6,911,070 discloses a process for obtaining a liquid colloidal soluble fire and flame retardant and inhibiting mixture for natural and porous synthetic substrates comprising the steps of: a) mixing, as first step, 3-8 percent derivatized cellulose in water to obtain a colloidal solvent; and, b) adding 15-40 percent of a charring agent, and of a blowing agent to the colloidal solvent, to obtain an intumescent base; and, c) allowing insoluble components of the intumescent base to sediment and collecting a supernatant; and, d) dissolving a source of phosphoric acid in the supernatant, to obtain a flame-quenching mixture.

WO2008/150157 discloses a fire-retardant composition consisting essentially of water-soluble flame-extinguishing agent, an intumescent agent and a complexing agent, and optionally a charring agent. Phosphate-containing agent, such as ammonium hydrogen phosphate, is used as the flame-extinguishing agent.

There is still need for fire retardant compositions which are economically and environmentally acceptable. The use of large amounts harmful compounds, such as phosphor or boron, should be avoided, as well as excess release of undesired gases, such as carbon dioxide. Further, such compositions should be stable for a long period of time and they should be applicable to several types of materials, such as wood.

SUMMARY OF THE INVENTION

The present invention provides an aqueous fire retardant composition comprising ammonium, phosphoric acid, diammonium phosphate, ammonium sulfate, urea, and a complexing agent.

The present invention also provides methods for treating wood wherein the wood is treated with said composition.

The present invention also provides wood obtained by said method(s).

One advantage of the fire retardant composition of the present invention is that it forms a protective layer and/or foam on the treated wood which acts as an efficient fire retardant. This insulating protective layer prevents fire from penetrating into the wood thus maintaining the tissue of the wood intact.

Another advantage of the present invention is that the fire retardant composition is inexpensive when compared to many commercial products.

Still another advantage of the present invention is that the fire retardant composition is less toxic than many commercial products, such as those containing phosphoric acid or boron. For example the amount of phosphoric compounds used in the inventive composition can be kept at a relatively low level. No protective equipment is required in the treatment.

Still another advantage of the present invention is that the color of the treated wood does not change. Further, it has been noticed that the composition also prevents the wood from cracking, rotting and blue staining therefore acting as a preservative composition.

DETAILED DESCRIPTION OF THE INVENTION

Figure 1:
FIG. 1 shows the surface of the object right after the fire.

The present invention provides an aqueous fire retardant composition comprising phosphoric acid as a fire retardant agent, ammonium, diammonium phosphate, ammonium sulfate, urea, and a complexing agent. The composition may be used to treat a material, such as wood. The composition may also be used as a fire extinguishing agent or as liquid to be used in a fire extinguisher.

The ammonium helps the composition to be absorbed to the material to be treated. Generally an aqueous solution of ammonium is used for composing the composition. The ammonia may be present in an amount of about 15-20% (v/v).

The numeric values presented herein are generally approximate. The percentages are weight percentages unless otherwise indicated.

The phosphoric acid is one of the main fire/flame retardant agents. The useful concentration of phosphoric acid may vary, but generally 85% (w/w) stock solution may be used. Also 75% (w/w) solution is usable. The phosphoric acid may be present in an amount of about 5-10% (w/v), for example 2.5-7.5% (w/v).

Also ammonium sulfate, such as monoammonium sulfate or diammonium sulfate, is used as a fire retardant agent to replace any phosphoric compounds. The ammonium sulfate may be present in an amount of about 5-10% (w/v), for example 2.5-7.5% (w/v). In one embodiment the ratio of ammonium sulfate to phosphoric acid is in the range of 1:1 to 99:1, for example in the range of about 3:1 to 10:1, such as about 1:1 (w/w). This way the amount of phosphoric compounds, such as phosphoric acid, can be kept at a low level. In one example a small amount of zinc borate may be added to enhance the effect, such as about 5-25% of the amount of the phosphoric acid. In one embodiment the ratio of phosphoric acid:zinc borate:ammonium sulfate is about 1:1:2. The ammonium sulfate also lowers the pH thus reducing the need for other pH adjusting agent(s). In one embodiment the amount of ammonium sulfate is about the same as the amount of phosphoric compounds, or the phosphoric acid. Generally the pH of the composition should be substantially neutral i.e. about 7.

Diammonium phosphate has also fire retardant properties. Diammonium phosphate may be present in an amount of about 10-25% (w/v), such as about 13-20% (w/v) Also monoammonium phosphate may be used, or combinations thereof, such as in about the ratio of 50:50 (w/w). In one example trisodium citrate may also be used to replace any ammonium phosphate, for example about 5-50% (w/w). Trisodium citrate is a non-toxic and inexpensive compound. In one embodiment the ratio of monoammonium phosphate:diammonium phosphate:potassium chloride:trisodium citrate is about 1:1:1:1.

Urea has also fire/flame retardant properties, but may also be considered as an intumescent agent. Generally urea stock solution of about 46% is useful. Urea may be present in an amount of about 2-10% (w/v), such as 3-5% (w/v)

Part of the urea and/or diammonium phosphate may be substituted with slag, such as Thomas slag or basic slag, which is an inexpensive material. Basic slag is a byproduct of steelmaking. It is largely limestone or dolomite which has absorbed phosphate from the iron ore being smelted. It is used as fertilizer in gardens and farms in steelmaking areas. Basic slag generally contains at least 12% total phosphoric acid ($P_2O_5$). In one embodiment the composition further comprises slag. Part of the urea may also be substituted with guanidine sulfamate, which is a swelling, non-smoking agent. The substituted part may be for example in the range of 5-50% (w/w) of the urea and/or diammonium phosphate. Also zinc borate may be added to urea or guanidium sulfamate. In one embodiment the ratio of zinc borate:urea:guanidine is about 1:2:2.

Intumescent agents are known in the art. They are also useful as flame retardants in normally flammable compositions. By definition, intumescence is a state of being tumid or inflated. An intumescent coating is one that will enlarge or expand to form a cellular structure when exposed to sufficient heat. Coatings of the intumescent type provide protection to heat and/or fire-vulnerable substrates by forming a flame retardant, thermally insulating barrier over the substrate. Other intumescent agents which may be used in the composition include guanidine, guanidine hydrochloride, glycine and further water-soluble amino acids and derivatives thereof such as amides.

In one embodiment the composition further comprises a charring agent. In one embodiment the charring agent is glycerol. Other suitable charring agents include dextrin, inositol, amylase, water-soluble polysaccharides, pentaerythritol, dipentaerythritol and polyalcohols. In one embodiment the composition further contains a charring agent, such as glycerol, in amount of about 0.1-1% (w/w), such as about 0.1-0.5% (w/w). In one example zinc borate together with aluminum hydrate may be used to replace part (for example 5-50% w/w) of the glycerol or any other charring agent. Also aluminum trihydrate may be used, for example as in an amount of 2-3 times of glycerol, or as a mixture thereof, for example as a ratio, of glycerol:aluminum trihydrate in the range of about 1:3 to 3:1, such as about 1:1. The hydrates will release water when heated even at moderate temperatures so they may enhance the charring effect.

In another embodiment the composition further comprises a pH adjusting agent, such as hydrochloric acid or citrate, such as trisodium citrate. The pH adjusting agent is added mainly to neutralize the pH of the basic solution. Any suitable inorganic acid or organic acid may be used. Trisodium citrate may also be used to replace part (for example 5-50% w/w) of the ammonium phosphate, such as diammonium phosphate.

The complexing (or chelating) agent may be selected from EDTA, EGTA, nitrilotriacetic acid, diethylene pentaacetic acid, dodecane tetraacetic acid and salts thereof. In one specific embodiment the complexing agent is ethylenediamine tetraacetic acid (EDTA). The complexing (or chelating) agent may be present in an amount of about 0.3-2% (w/v), such as about 0.5-1.5% (w/v)

In one example the aqueous fire retardant composition is obtained by a) mixing aqueous ammonium solution and phosphoric acid, b) after about 30 minutes adding diammonium phosphate, and c) after about 15 minutes adding urea and a complexing agent.

In one example in step a) also ammonium sulfate is added.

In one example in step b) the pH is adjusted to about 7 with a pH adjusting agent.

In another example in step c) a charring agent, such as glycerol, is added.

The complexing agent may be as defined above. The composition may contain further agents, such as potassium chloride, monoammonium phosphate or trisodium citrate. In one embodiment the composition contains potassium chloride as a fire retardant. Potassium chloride is inexpensive so it is advantageous to use it as a supplemental agent.

In one embodiment the composition contains also a surfactant, such as WP-3 by Faintend Ltd, Finland. The surfactant helps the composition to enter the wood by lowering the surface tension between the liquid (the composition) and the solid (wood). Any suitable surfactant may be used, such as ionic or non-ionic. The surfactant may be added at any step, such as in step c).

In one example the composition contains approximately the following amounts of compounds in aqueous solution (water may be added up to 100%):
  5-10% (w/v) phosphoric acid,
  5-10% (w/v) ammonium sulfate
  15-20% (v/v) ammonia,
  13-20% (w/v) diammonium phosphate,
  3-5% (w/v) urea, and
  0.5-1.5% (w/v) complexing agent.

In a further example the composition contains further glycerol in amount of about 0.2% (w/w).

In one embodiment about half of the phosphoric acid is replaced with ammonium sulfate i.e. the ratio of phosphoric acid and ammonium sulfate is about 50:50.

In another embodiment the composition contains approximately the following amounts of compounds in aqueous solution:

2.5-7.5% (w/v) phosphoric acid,
2.5-7.5% (w/v) ammonium sulfate,
15-20% (v/v) ammonia,
13-20% (w/v) diammonium phosphate,
3-5% (w/v) urea, and
0.5-1.5% (w/v) complexing agent.

The composition is an aqueous solution. In one embodiment distilled water is used as a diluent when composing the composition. In one embodiment ammonium water is used as a diluent when composing the composition. The described compositions may be used as such, or they can be further diluted, for example to about 50% dilution with water. Even about 25% dilution is still usable.

The present invention provides methods for treating wood. In one embodiment the present invention provides a method for protecting wood against fire, wherein the wood is treated with the composition of the invention to obtain a protection against fire. The composition may also act as a preservative composition against decay or as an anti-rot agent. In another embodiment the present invention provides a method for protecting or preserving wood against decay or rot, wherein the wood is treated with the composition of the invention to obtain a protection against decay or rot.

The wood may be treated with any suitable known method, such as (pressure) impregnation, immersion or brushing (painting). The composition is easily penetrated to the wood, especially when pressure is used. For the protective purposes the adequate amount of the composition to be absorbed to pine wood is in the range of 400-500 kg/m$^3$. For spruce the amount of 120-200 kg/m$^3$ may be enough. Generally the range of 100-950 kg/m$^3$ is adequate for most wooden materials.

In some embodiments the wood is treated with any of the following protocols wherein the process contains at least the listed steps. The values are approximate. "Liquid" refers to the composition of the invention as an aqueous solution. The process is generally carried out in a treatment tank or the like. The "intake" typically refers to suction of the liquid into the treatment tank.

In one embodiment called vacuum process the method comprises
providing initial vacuum of about 25-50 mbar (30 min),
intaking the liquid (at about 20° C.) into treatment (30 min).
rising the pressure to ambient pressure (5 min),
holding the ambient pressure (5 min),
removing the liquid (15 min), and
providing final vacuum of about 500 mbar (20 min).

With this method birch material may absorb up to 300 kg/m$^3$ of the fire retardant composition.

In one embodiment called vacuum and overpressure process the method comprises
providing initial vacuum of about 25-50 mbar (30 min),
intaking the liquid (at about 20° C.) into treatment (30 min).
rising the pressure from about 25 mbar to 10 about bar (60 min),
holding the pressure at about 10 bar (60 min),
removing the liquid (15 min), and
providing final vacuum of about 500 mbar (20 min).

With this method spruce material may absorb up to 200 kg/m$^3$ of the fire retardant composition.

In one embodiment called overpressure process the method comprises
providing initial vacuum in the ambient pressure,
intaking the liquid (at about 20° C.) into treatment (30 min).
rising the pressure to about 12.5 bar (30 min),
holding the pressure at about 12.5 bar (60 min), and
removing the liquid and lowering of the pressure (15 min).

With this method pine material may absorb up to 800 kg/m$^3$ of the fire retardant composition.

The treatment may be carried out at ambient temperature, such as about 20° C., but the absorption of the liquid may be enhanced by preheating the wood material, for example to about 30° C. Also warm fire retardant composition, such as about 30° C., will absorb better to the wood.

The wood may also be colored with said treatment when a suitable coloring agent is added to the composition of the invention.

The present invention also provides wood obtained by any of said methods or protocols.

EXAMPLES

Example 1

The following is an example for preparing 1000 liters of the composition of the invention.

461.3 liters of water, 167.4 liters of aqueous ammonium (24.5% stock solution) and 85.6 liters of phosphoric acid (85% solution) are mixed together. After 30 minutes 163 kg of diammonium phosphate is added. After 15 minutes the pH is adjusted with 17.9 liters of hydrochloric acid to pH 7. After 15 minutes 75.2 kg of 46% (total nitrogen) urea is added together with 21.1 kg of glycerol and 8.6 kg of EDTA.

Example 2

Fire Resistance Testing

The purpose of the testing was to test the effect of the fire retardant composition treatment carried out at different moisture contents to the fire resistance: ignition time, fire advance and the density of critical heat flux (CHF). The tests were carried out by using SFS-EN ISO 9239-1 Radiant panel test. For some of the objects also caloric value was determined with bomb calorimeter assay according to standard SFS-EN ISO 1716:2002.

The used standards were:
SFS-EN 13501-1 Fire classification of construction products and building elements. Part 1: Classification using data from reaction to fire tests.
SFS-EN 9239-1 Reaction to fire tests for floorings. Part 1: Determination of the burning behavior using a radiant heat source (ISO 9239-1:2002).
SFS-EN ISO 1716 Reaction to fire tests for building products. Determination of the heat of combustion (ISO 1716:2002).
SFS-EN ISO 1182 Reaction to fire tests for products. Non-combustibility test.

Test equipment:
Memmert UFE 600 dry kiln,
Precisa BJ 6100 D scales
SFS-EN ISO 9239-1 radiant heat panel device
SFS-EN ISO 1716 caloric value test
SFS-EN ISO 1182 test equipment The test objects were pine boards treated with the fire retardant composition of Example 1 by pressure impregnation method. The timber was mainly sapwood. Different batches contained sawn pine timber having different moisture contents.

All the test objects were machine-dried to correspond to the moisture content of working conditions before the actual fire resistance testing.

Burning Behavior Using a Radiant Heat Source

ISO 9239-1:2010 specifies a method for assessing the wind-opposed burning behavior and spread of flame of horizontally mounted floorings exposed to a heat flux radiant gradient in a test chamber, when ignited with pilot flames.

Determination of the Gross Heat of Combustion

ISO 1716:2010 specifies a method for the determination of the gross heat of combustion of products at constant volume in a bomb calorimeter.

Non-Combustibility Test ISO 1182

The non-combustibility test determines the temperature rise of the furnace (ΔT), the mass loss of the specimen (Δm), and the time of sustained flaming of the specimen ($t_f$). A test specimen is located inside a cylindrical furnace tube at 750° C. for 30 minutes. The furnace and specimen temperatures are measured continuously during the test. Potential combustion of the test specimen is registered as temperature rise and/or visible flames. Mass loss of the test specimen is calculated after the test. These parameters are used to decide if the product is non-combustible or not.

Results

Results for the Radiant Heat Source Test

The composition formed a fire resisting foam-like coating on the tested specimen (FIG. 1). The heat radiator made the foam effervesce and blacken on the surface of the objects at the beginning of the test. When the specimen were exposed to the pilot flame the object was ignited, but the flame did not advance because of the foam. The exact ignition time is hard to determine because of the intense foaming on the surface.

Figure 2:
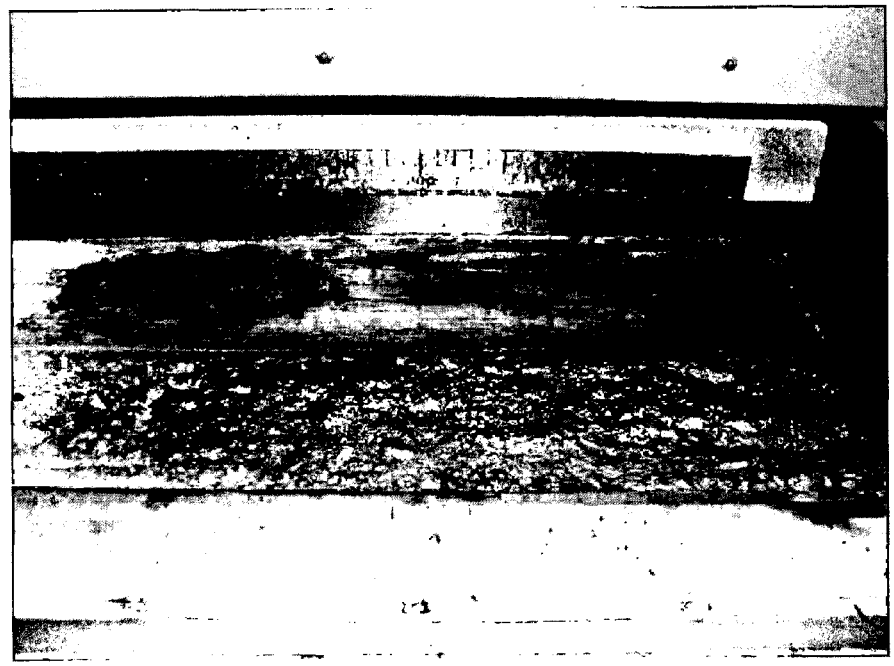
FIG. 2 shows how the darkened foam has been scraped off from the surface and unburnt wood is uncovered.

Most of the ignited objects went out immediately after the removal of the pilot flame (at 720 seconds) and did not continue burning with only the heat of the heat radiator. However, the surface of the objects did foam intensively until the end of the test (1800 seconds). At 600 seconds the surface had foamed on average 300 mm and at 1800 seconds 450 mm. After the test the darkened foam could be easily removed especially from planed timber (FIG. 2).

Figure 3:
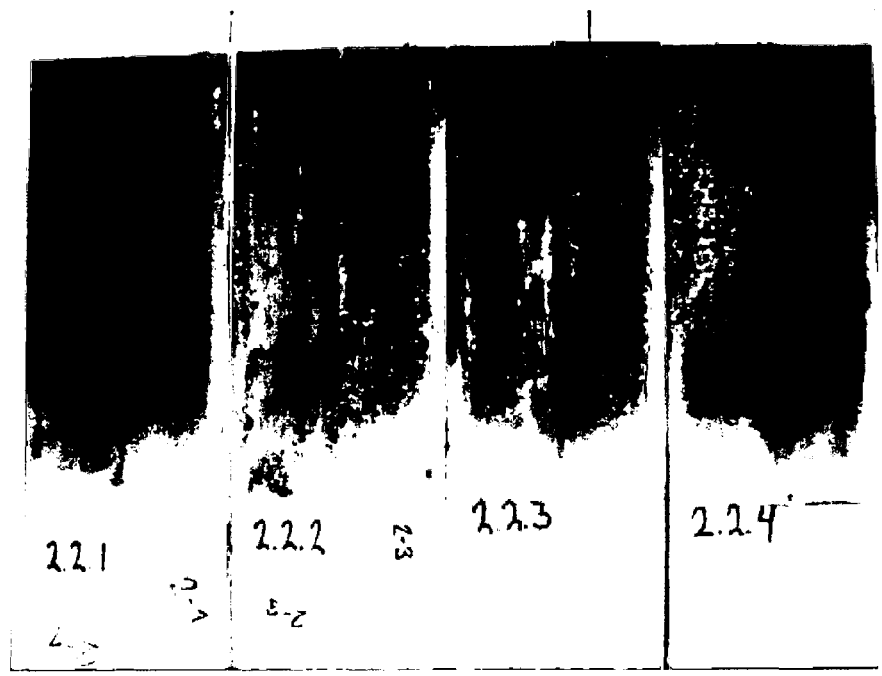
FIG. 3 shows the advance of fire (average 75 mm) on patch 2 plained objects. On objects 2.2.1 and 2.2.2 it can be seen how the unburnt wood is uncovered from beneath the darkened foam.
Figure 4:
FIG. 4 shows the advance of the fire (average 688 mm) on untreated objects.
Figure 5:
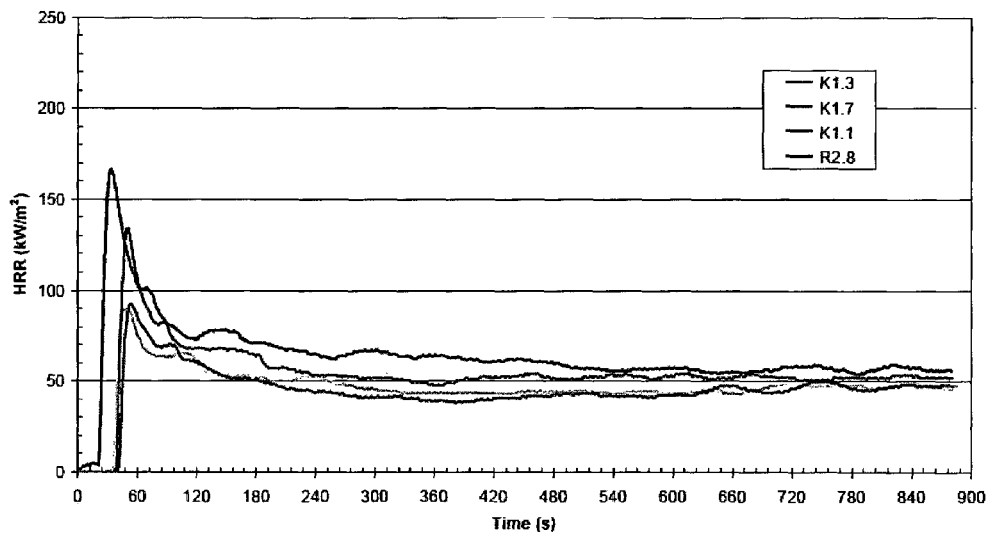
FIG. 5 shows the heat release rate of K1-samples in cone calorimeter tests at an irradiance of 50 kW/m$^2$.
Figure 6:
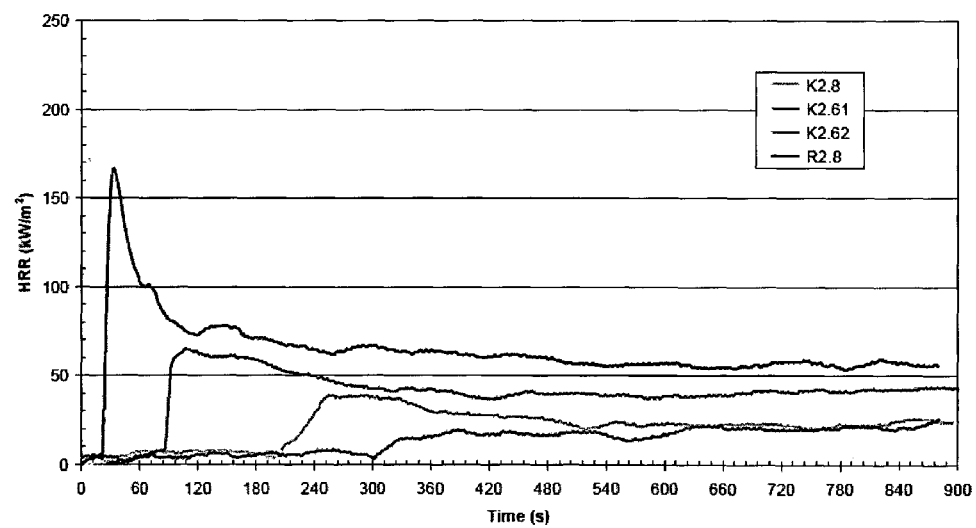
FIG. 6 shows the heat release rate of K2-samples in cone calorimeter tests at an irradiance of 50 kW/m$^2$.
Figure 7:
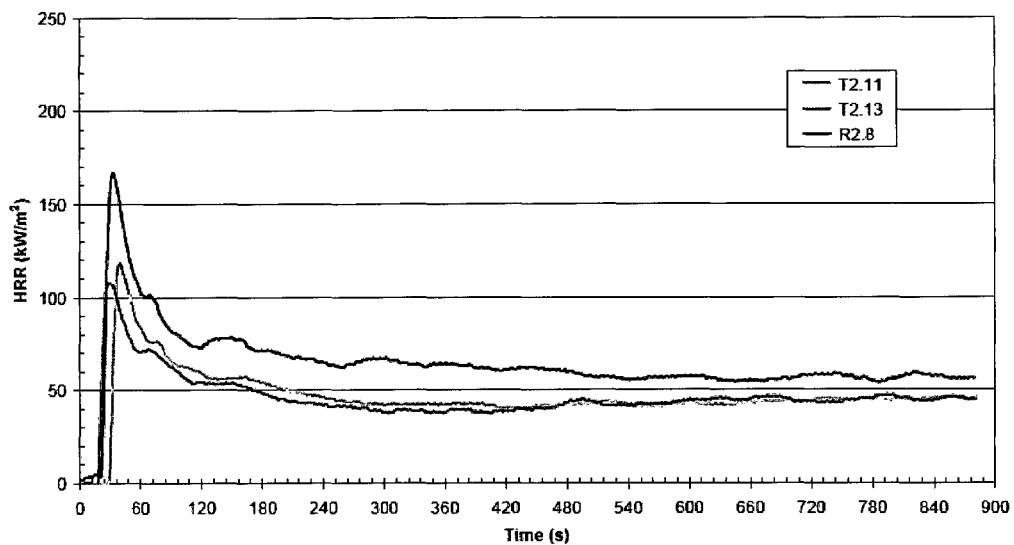
FIG. 7 shows the heat release rate of T2-samples in cone calorimeter tests at an irradiance of 50 kW/m$^2$.
Figure 8:
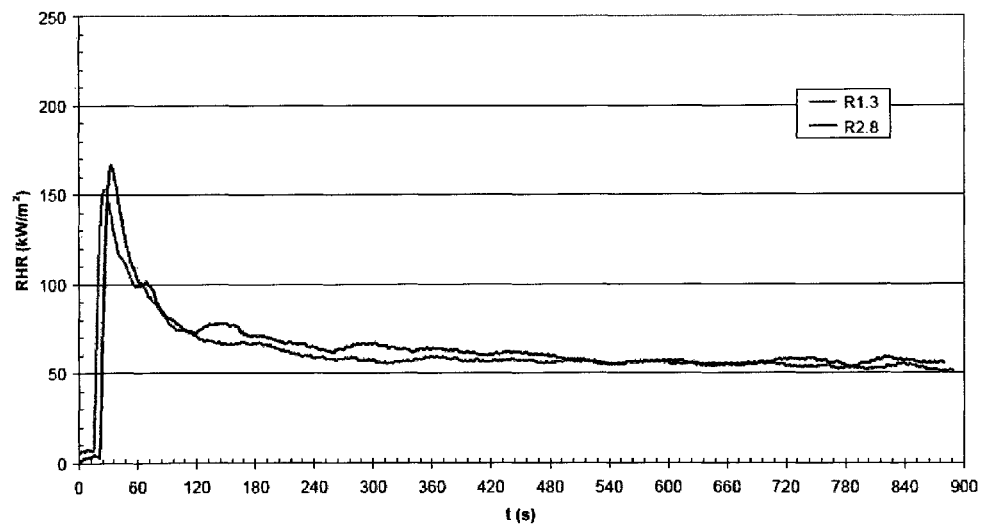
FIG. 8 shows the heat release rate of R-samples in cone calorimeter tests at an irradiance of 50 kW/m$^2$.

All the tested specimens required energy over 8.42 kW/m² for the combustion. The objects of patch 1 seemed to have the best fire resistance with the density of heat flux on average 10.7 kW/m² and the fire advance of 100 mm. However, there was no great difference between different patches (table 1). The fire resistance of sapwood and heartwood objects did not differ remarkably. The sapwood objects were burned at the heart face of the wood and the heartwood objects from the sapwood face. The pitch wood characteristic for pine helped the fast spreading of the flame in certain sapwood objects. When a piece of about 3 mm was planed from the surface of the objects before the fire tests, the fire resistance of the heartwood objects was remarkably impaired (table 1). The planning of the surface did not affect the sapwood objects. FIGS. 3 and 4 show examples of treated and untreated wood after the fire tests.

TABLE 1

The average values from the radiant heat source test

|  | CHF (kW/m²) | Max fire advance (mm) | Ignition time (s) |
|---|---|---|---|
| Patch 1 | 10.7 | 100 | 133 |
| Patch 2 | 10.4 | 116 | 137 |
| Patch 3 | 10.4 | 106 | 141 |
| Reference | N/A | 688 | 127 |
| Sapwood (sawn) | 10.4 | 117.5 | 137.4 |
| Sapwood (planed) | 10.7 | 87.5 | 135.3 |
| Heartwood (sawn) | 10.5 | 106.7 | 136.7 |
| Sapwood planed 3 mm | 10.9 | 75. | 140 |
| Heartwood planed 3 mm | 9.4 | 190 | 133 |

Example 3

Cone Calorimeter Tests for Fire Retardant Treated Wood

Samples:

Product codes: K1, K2 and T2

Type of product: fire retardant treated, planed pine board

Thickness (measured): 48 mm

Densities (measured): 340-475 kg/m³

Reference: R (planed pine board)

Thickness (measured): 48 mm

Density (measured): 385-425 kg/m³

Test method: cone calorimeter, ISO 5660-1:2002

Heat flux: 50 kW/m²

Test days: 9 Feb. 2010

Number of tests: 10 (2-3 per product)

The test specimens were conditioned at a temperature of 23±2° C. and a relative humidity of 50±5% to constant mass before the tests.

According to the test standard, a minimum of three tests per product shall be carried out, and the end of test criterion shall be selected depending on the fire behavior of the test specimen. Due to the thickness of the samples, the extinction time of the test specimens would have been evidently over 30 minutes. On the customer's request, 2-3 tests per product were made and the test time of all tests was shorter than required.

The ignition time, the extinction time, and the first maximum of the heat release rate (measured within the first 300 s of the test) of the test specimens in cone calorimeter tests at an irradiance of 50 kW/m² are shown in Tables 3-6.

TABLE 3

Ignition time, extinction time and the first heat release maximum for K1-samples.

| Quality | K1.3 | K1.7 | K1.1 |
|---|---|---|---|
| Ignition time (s) | 37 | 41 | 42 |
| Extinction time (s) | * | * | * |
| 1st heat release maximum (kW/m²) | 90 | 134 | 92 |

* The test was terminated before extinction.

TABLE 4

Ignition time, extinction time and the first
heat release maximum for K2-samples.

| Quality | K2.8 | K2.61 | K2.62 |
|---|---|---|---|
| Ignition time (s) | 220** | 83 | 295 |
| Extinction time (s) | * | * | * |
| 1st heat release maximum (kW/m$^2$) | 39 | 65 | 8 |

\* The test was terminated before extinction.
\*\* Transitory flaming at 175 s and 190 s-220 s.

TABLE 5

Ignition time, extinction time and the first
heat release maximum for T2-samples.

| Quality | T2.11 | T2.13 |
|---|---|---|
| Ignition time (s) | 31 | 21 |
| Extinction time (s) | * | * |
| 1st heat release maximum (kW/m$^2$) | 119 | 108 |

\* The test was terminated before extinction.

TABLE 6

Ignition time, extinction time and the first
heat release maximum for R-samples.

| Quality | R1.3 | R2.8 |
|---|---|---|
| Ignition time (s) | 18 | 24 |
| Extinction time (s) | * | * |
| 1st heat release maximum (kW/m$^2$) | 153 | 167 |

\* The test was terminated before extinction.

Based on the cone calorimeter results of the tested specimens, product K1 may not meet the requirements of Euroclass B according to the European fire classification system for construction products. At the beginning of the SBI test (EN 13823), the FIGRA-values (FIGRA=fire growth rate) of the product may exceed the highest level (120 W/s) allowed for products of Euroclass B. During time period 180-600 s the HRR-level of the product was close to the level of the reference, so it is possible that the THR-value (THR=total heat release in first 600 s) measured in the SBI-test might exceed the highest level (7.5 MJ) allowed in Euroclass B. In Euroclass C, the criterion is ≤15 MJ.

Product K2 may fulfill the requirements of Euroclass B. However, there was a lot of variation in the ignition times and the heat release rates, so it is possible that in a larger scale test there will be variance in the fire behavior, too.

The ignition times of product T2 were rather short and the heat release rates at the beginning of the tests a bit high, so it probably meets the requirements of Euroclass C or D.

Most untreated wood products fall in Euroclass D.

The official classification requires testing according to standards EN 13823 and EN ISO 11925-2. The results relate to the behavior of the test specimens of a product under the particular conditions of the test; they are not intended to be the sole criterion for assessing the potential fire hazard of the product in use.

Example 4

Processability of Treated Wood

The impregnability of spruce timber was tested with two impregnation tests (Table 7) using the composition of Example 1. The aim of the tests was to reach at least 20-50 kg/m$^3$ impregnability of the composition.

TABLE 7

The process values of the impregnation processes

| Treatment | Initial vacuum | Suction of the liquid into the tank | Rise of the pressure | Hold of the pressure | Removal of the liquid | End vacuum |
|---|---|---|---|---|---|---|
| Impregnation 1 Process time 1 h 2 min | 3 min 270 mbar 15° C. | 11 min | 2 min | Norm pressure 3 min 15° C. | 10 min | 20 min 500 mbar |
| Impregnation 2 Process time 2 h 41 min | 20 min 100 mbar 16° C. | 8 min | 31 min | 10 bar 60 min 16° C. | 9 min | 20 min 500 mbar |

The treatments were carried out according to the set values. No harmful odour was detected. There were no substantial staining problems during the tests.

Figure 9:
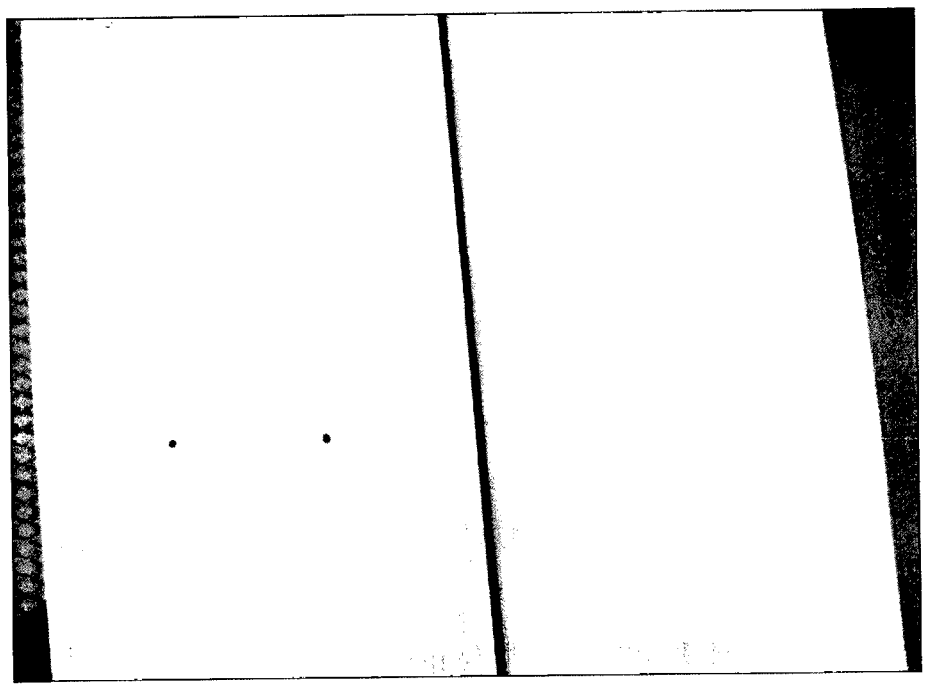
FIG. 9 shows an object from Impregnation 2 after three weeks drying (left) and a reference object (right). Some of the composition was crystallized on the surface of the impregnated object.

Right after the impregnation no difference was observed when compared to for example waterlogged or wet-impregnated spruce objects. During drying the colour of the surface of the timber was slightly lightened and especially when dried more, some crystallized composition was detected on the surface. Except for the crystallized areas, the appearance of the impregnated objects did not substantially differ from the untreated reference objects (FIG. 9).

TABLE 8

Summary of the absorption measurements in two impregnations.
The amount of the protective composition when the water
content was eliminated from the measurement (50%).

| | Measurement | | | |
|---|---|---|---|---|
| | Impregnation 1 Spruce 48 × 98 mm | Impregnation 1 Spruce 48 × 148 mm | Impregnation 2 Spruce 48 × 98 mm | Impregnation 2 Spruce 48 × 148 mm |
| Average kg/m$^3$ | 6 | 10 | 58 | 49 |
| Standard deviation | 1 | 2 | 25 | 10 |
| Minimum kg/m$^3$ | 5 | 7 | 25 | 36 |
| Maximum kg/m$^3$ | 8 | 13 | 96 | 61 |

In the fast impregnation (Impregnation 1) the absorption is quite low (Table 8). In the conventional impregnation (Impregnation 2) the absorption is much, stronger. When the amount, of water (50%) is eliminated, the amount of the protective composition right after the impregnation 2 is 50-60 kg/m$^3$ as theoretically calculated.

The paintability of the timber from impregnation 2 was tested with Tikkurila oil paint and Tikkurila Valtti Akvacolor water-dilutable paint. The paint spread well to the impregnated and the reference object. No differences on the paintability were observed. No clod formation was observed.

The invention claimed is:

1. An aqueous fire retardant composition comprising phosphoric acid, ammonia, diammonium phosphate, ammonium sulfate, urea, and a complexing agent.

2. The composition of claim 1, comprising a charring agent.

3. The composition of claim 1, comprising an intumescent agent selected from guanidine, guanidine hydrochloride, glycine and further water-soluble amino acids and derivatives thereof.

4. The composition of claim 2, wherein the charring agent is selected from glycerol, zinc borate, aluminum hydrate, aluminum trihydrate, dextrin, inositol, amylase, water-soluble polysaccharides, pentaerythritol, dipentaerythritol and polyalcohols.

5. The composition of claim 1, comprising trisodium citrate.

6. The composition of claim 1, comprising monoammonium phosphate.

7. The composition of claim 1, comprising guanidine sulfamate.

8. The composition of claim 1, comprising a surfactant.

9. The composition of claim 1, comprising slag.

10. The composition of claim 1, comprising potassium chloride.

11. The composition of claim 1, wherein the complexing agent is selected from EDTA, EGTA, nitrilotriacetic acid, diethylene pentaacetic acid, dodecane tetraacetic acid and salts thereof.

12. The composition of claim 1, containing
5-10% (w/v) phosphoric acid,
5-10% (w/v) ammonium sulfate,
15-20% (v/v) ammonia,
13-20% (w/v) diammonium phosphate,
3-5% (w/v) urea, and
0.5-1.5% (w/v) complexing agent in aqueous solution.

13. The composition of claim 1, containing
2.5-7.5% (w/v) phosphoric acid,
2.5-7.5% (w/v) ammonium sulfate,
15-20% (v/v) ammonia,
13-20% (w/v) diammonium phosphate,
3-5% (w/v) urea, and
0.5-1.5% (w/v) complexing agent in aqueous solution.

14. A method for protecting wood against fire, comprising treating the wood with the composition of claim 1.

15. A method for protecting wood against decay or rot, comprising treating the wood with the composition of claim 1.

16. The method of claim 14, comprising treating the wood by (pressure) impregnation, immersion or brushing.

17. The method of claim 14, comprising:
providing initial vacuum of about 25-50 mbar (30 min),
intaking the liquid into treatment (30 min),
rising the pressure to ambient pressure (5 min),
holding the ambient pressure (5 min),
removing the liquid (15 min), and
providing final vacuum of about 500 mbar (20 min).

18. The method of claim 14, comprising:
providing initial vacuum of about 25-50 mbar (30 min),
intaking the liquid into treatment (30 min),
rising the pressure from about 25 mbar to about 10 bar (60 min),
holding the pressure at about 10 bar (60 min),
removing the liquid (15 min), and
providing final vacuum of about 500 mbar (20 min).

19. The method of claim 14, comprising:
providing initial vacuum is the ambient pressure,
intaking the liquid into treatment (30 min),
rising the pressure to about 12.5 bar (30 min),
holding the pressure at about 12.5 bar (60 min), and
removing the liquid and lowering the pressure (15 min).

20. Wood obtained by the method of claim 14.

\* \* \* \* \*